Dec. 3, 1935.  V. B. TAYLOR  2,022,947
INTERNAL BRAKE FOR AUTOMOBILES
Filed Dec. 30, 1931  2 Sheets-Sheet 1
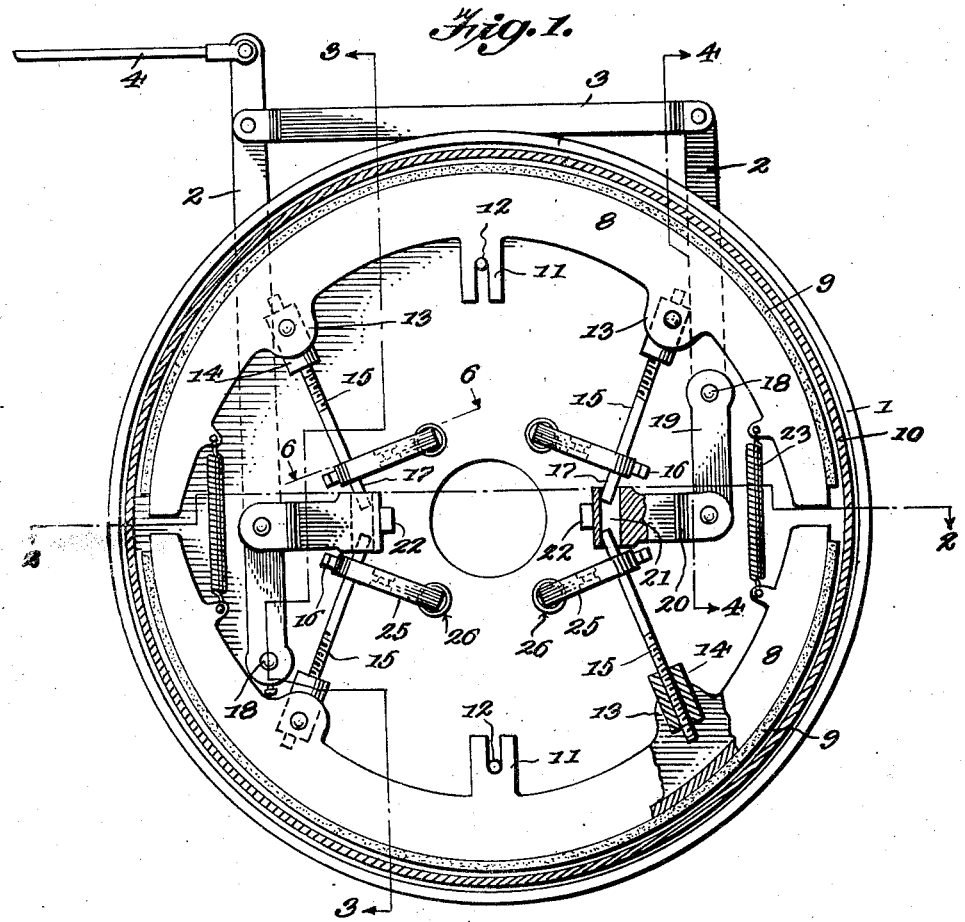
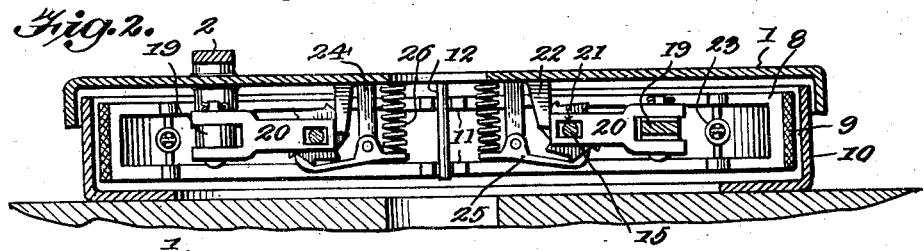
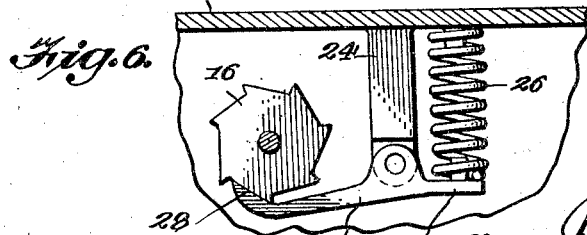
Inventor
VAN B. TAYLOR

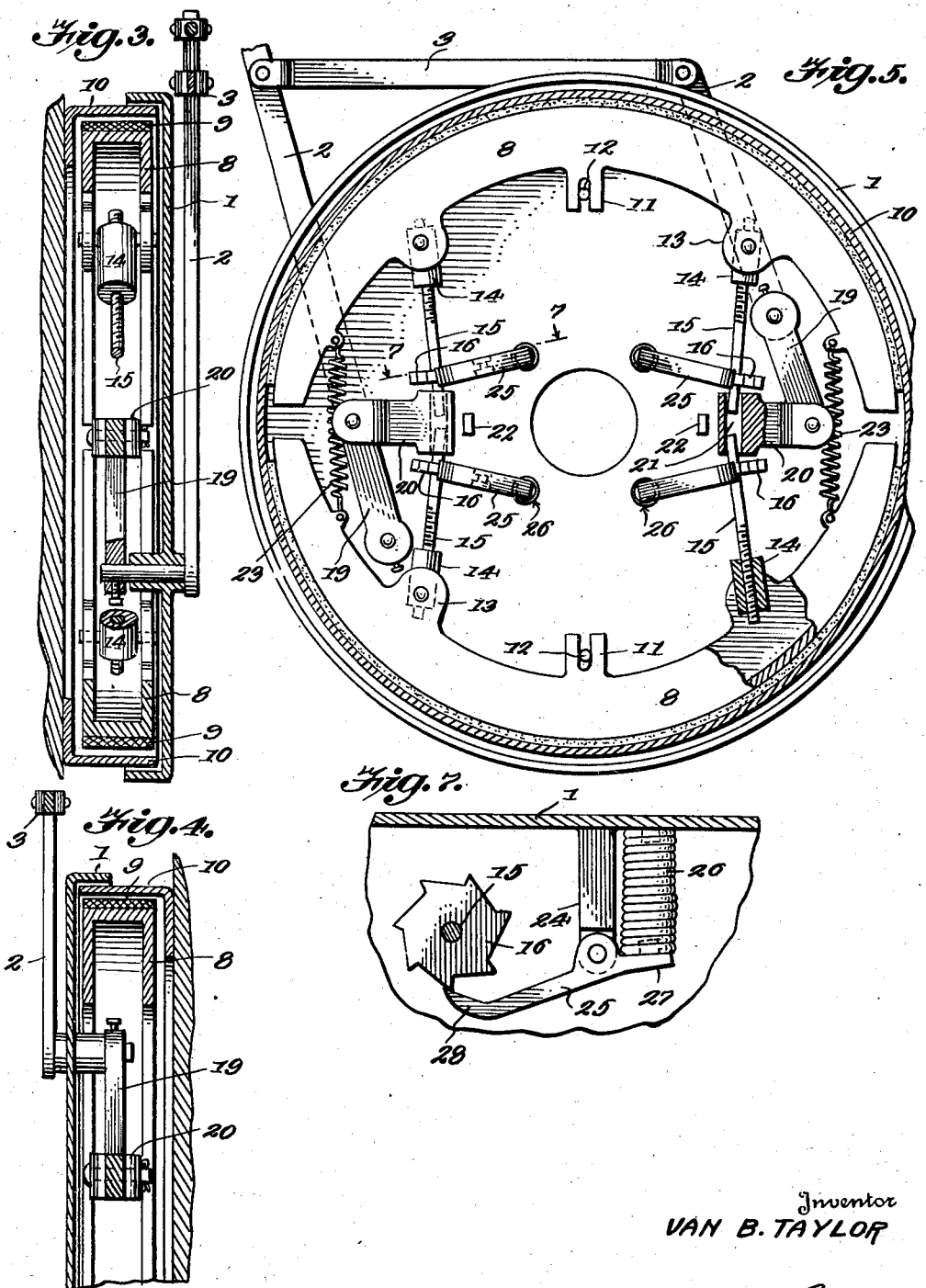

Patented Dec. 3, 1935

2,022,947

UNITED STATES PATENT OFFICE 2,022,947

INTERNAL BRAKE FOR AUTOMOBILES

Van B. Taylor, Miami, Fla.

Application December 30, 1931, Serial No. 583,884

8 Claims. (Cl. 188—79.5)

This invention relates to automobile and other vehicle brakes, and has for its object the production of a simple and efficient mechanism for automatically adjusting the brake shoes for the purpose of causing the brake shoes to efficiently grip the brake drum when the brakes are applied.

Another object of this invention is the production of a simple and efficient internal brake for motor cars and other vehicles which is self-adjusting and may be kept in perfect adjustment by the forward and backward travel of the brake pedal without the necessity of employing mechanical aid.

Another object of this invention is the production of a simple and efficient internal brake which will permit the foot pedal and power levers at all times to remain in a preferred or selected position.

A still further object of this invention is the provision of a simple and efficient internal brake which will apply the pressure evenly to all parts of the brake lining and brake drum by applying pressure at four equal points around the circumference of the drum.

With these and other objects in view, this invention consists in certain combinations, arrangements and formations of parts as will be hereinafter more fully described and claimed.

In the drawings:—

Figure 1 is a vertical sectional view through the brake drum showing the brake shoes and actuating mechanism in side elevation, certain parts being broken away and shown in section;

Figure 2 is a section taken on line 2—2 of Figure 1;

Figure 3 is a vertical section taken on line 3—3 of Figure 1;

Figure 4 is a section taken on line 4—4 of Figure 1;

Figure 5 is a sectional view similar to Figure 1 showing the brake shoes applied in a braking position;

Figure 6 is a section taken on the line 6—6 of Figure 1 showing one of the pawls in a complete ratchet engaging position illustrating the position of the pawls and ratchets when the brakes are released;

Figure 7 is a section taken on line 7—7 of Figure 5 showing the position of the ratchets and pawls when the brakes are applied.

By referring to the drawings, it will be seen that I designates the brake housing which may be supported in any suitable or desired manner and as usual a plurality of these housings are used in connection with each vehicle and may be supported in any suitable or desired manner. Each housing I supports a pair of pivotally mounted arms 2 which arms are connected by means of links 3. One of the arms 2 may be connected to a suitable brake operating rod 4.

The principal feature of the present invention is the production of a structure embodying means for permitting an internal adjustment of the brake within the brake housing I, and this structure comprises a pair of brake shoes 8 which carry suitable brake linings 9 which linings are adapted to contact with the brake drum 10, as is usual with brakes of this type. The shoes 8 are provided with bifurcated guiding lugs 11 which fit over securing pins 12 carried by the housing I to hold the shoes against accidental displacement. Each shoe 8 is provided with a plurality of lugs 13 formed near the inner face thereof to which lugs 13 are pivotally secured the adjusting nuts 14, these adjusting nuts 14 receiving the threaded or adjustable bolts 15. These threaded or adjustable bolts 15 are so mounted as to have the bolts 15 of each shoe 8 extend in converging relation toward the center of the drum 10, as shown clearly in Figures 1 and 5. These adjusting bolts 15 preferably converge toward the hub or center of the drum and fall together at an apex point of about twenty degrees relative to the diameter of the drum. Each threaded adjusting bolt 15 carries a ratchet wheel 16 near its inner end and these adjusting bolts 15 also are provided with projecting ends 17 as shown clearly in Figures 1 and 5.

As will be noted by carefully considered Figures 1 and 5, the operating arms 2 are so pivoted upon the housing I as to pivotally support one of the arms 2 below the center of the housing and drum and the other arm above the center. Each of these arms 2 is provided with a projecting journal pin 18 which extends through the housing I and each journal pin 18 supports a crank arm 19 carried within the housing I and 2, these crank arms 19 being pivotally secured by bolt engaging links 20. The links 20 are provided with sockets 21 at their inner ends for receiving the projecting ends 17 of the adjusting bolts 15 as shown clearly in Figures 1 and 5. Suitable stop lugs 22 are carried by the housing I against which the ends of the links 20 rest for limiting the inward movement of these links 20. As shown in Figures 1 and 5, the brake shoes 8 are connected together and normally urged toward each other by means of the connecting springs 23.

The housing I carries upon its inner face, a plurality of supporting standards 24 upon which standards 24 are pivotally mounted the pawls 25 in such a position as to overhang the ratchet wheels 16 carried by the respective adjusting bolts 15, a separate pawl being used for each ratchet wheel, as illustrated clearly in Figures 1 and 5. Coil springs 26 are anchored at one end upon the housing 1 and engage the rear ends 27 of the pawls 25 for normally holding the pawl engaging hooks 28 of the pawls 25 in contact with the ratchet wheels 16. It should be understood that the adjusting bolts 15 are arranged in pairs connected to the opposite shoes 8, one adjusting bolt of each pair being threaded with a right-hand thread, and the other bolt of each pair being threaded with a left-hand thread to provide a proper adjustment or spreading of the shoes 8 as the adjusting bolts 15 are rotated.

The operation of the device is as follows:— As the arms 2 are swung, the crank arms 19 will also be swung, as for instance, in a forward direction, thereby spreading the links 20 apart and away from the stop lugs 22, this action pulling the inner ends of the adjusting bolts 15 away from the center of the drum and applying the brake shoes to a braking position. This of course will bodily move the ratchet wheels 6 carried by the respective bolts 15 causing the teeth of the ratchet wheels to move to a position such as is illustrated in Figure 7. Should, however, the brake lining 9 wear to such an extent as to make the application of the brakes inefficient, the further swing of the arms 2 will cause the adjusting bolts 15 to be moved to such a position as to cause the ratchet wheels 16 to be bodily moved beyond the distance of the length of one tooth of the ratchet wheel and cause the ratchet wheel engaging hook 28 of the pawl 25 to drop into engagement with the next succeeding tooth. As soon as the brakes are again released, the links 20 will move the adjusting bolts 15 back to their normal positions and due to the fact that the ratchet wheel 16 will engage the pawl 25, these bolts 15 naturally will be rotated further extending the nuts 14 upon the length of the bolts 15 and adjusting the shoes 8 outwardly. Through the medium of this action, a very minute and proper, as well as uniform, adjustment will take place due to the fact that there are a plurality of these adjusting bolts, preferably two to each shoe, and the adjustment of the brake will depend upon the distance of the throw of the brake pedal necessary to apply the brakes.

From the foregoing description it will be seen that a very simple and efficient means has been provided for permitting a proper adjustment of the brake shoes automatically within the brake housing merely by the application of the foot pedal, the mechanism automatically adjusting the shoes to their proper position to insure effective braking action.

It should be understood that certain mechanical changes in the construction and arrangement of parts may be employed without departing from the spirit of the invention, so long as these changes fall within the scope of the appended claims.

Having described the invention, what is claimed as new is:—

1. An internal brake mechanism of the class described comprising a housing, a drum carried by the housing, operating levers carried by said housing, a series of brake shoes, a pair of inwardly converging adjusting rods pivotally secured to said brake shoes, means for providing threaded engagement between said rods and brake shoes whereby the rotation of said rods will automatically adjust said shoes with respect to said drum, operating links engaging the ends of the rods of the respective brake shoes for moving said rods to and away from the center of said drum, means for rotating said adjusting bolts as said links are shifted, and means connecting said links with said operating levers.

2. A brake of the class described comprising a housing, a brake drum carried thereby, brake shoes carried by the drum, internally threaded members carried by said brake shoes in spaced relation, adjusting bolts fitting in said internally threaded members, ratchets carried by the inner ends of said adjusting bolts, spring pressed pawls contacting with said ratchets, and means for bodily moving said bolts and ratchets longitudinally of said pawls for causing the rotation of said bolts when said ratchets are moved a predetermined distance whereby said shoes will be automatically adjusted relative to said drum.

3. A brake of the class described comprising a housing, a drum associated therewith, a pair of operating levers pivotally secured to said housing, one being secured to the housing above the center and the other being secured to the housing below the center, a plurality of brake shoes, each shoe carrying a pair of adjusting bolts, said adjusting bolts being inclined inwardly toward the center of said drum, and means operable from said levers and engaging said bolts for adjusting said bolts longitudinally and relatively adjusting said shoes with respect to said drum when said levers are swung beyond a predetermined distance.

4. A brake of the class described comprising a housing, a drum associated therewith, a pair of operating levers pivotally secured to said housing, one being secured to the housing above the center and the other being secured to the housing below the center, a plurality of brake shoes, each shoe carrying a pair of adjusting bolts, said adjusting bolts being inclined inwardly toward the center of said drum, means operable from said levers and engaging said bolts for adjusting said bolts longitudinally and relatively adjusting said shoes with respect to said drum when said levers are swung beyond a predetermined distance, links for connecting said levers, and yieldable means for normally drawing said shoes to a retracted position.

5. A brake of the class described comprising a housing, a brake drum, brake shoes adjustably mounted within said drum, each brake shoe carrying a pair of threaded adjusting bolts, said bolts being inclined inwardly toward the center of said drum, a ratchet wheel carried by each bolt, a spring pressed pawl engaging each ratchet wheel and adapted to rotate said bolts when said bolts are swung in one direction beyond a predetermined point, links engaging the ends of the bolts of the opposite shoes, means engaging said links for moving said links to and away from the center of said drum for shifting said ratchet wheels with respect to said pawls, and means for limiting the inward movement of said links with respect to said drum and housing.

6. A brake of the class described comprising a housing, a brake drum, brake shoes adjustably mounted within said drum, each brake shoe carrying a pair of threaded adjusting bolts, said bolts being inclined inwardly toward the center of said drum, a ratchet wheel carried by each bolt, a spring pressed pawl engaging each ratchet wheel and adapted to rotate said bolts when said bolts are swung in one direction beyond a predetermined point, links engaging the ends of the bolts of the opposite shoes, means engaging said links for moving said links to and away from the center of said drum for shifting said ratchet wheels with respect to said pawls, means for limiting the inward movement of said links with respect to said drum and housing, and guiding means for guiding said brake shoes in their shifting movement.

7. A brake mechanism of the class described comprising a brake drum, brake shoes supported adjacent to said drum, individual longitudinally adjustable expansion means engaging each shoe for automatically adjusting said shoes upon the longitudinal adjustment of said expansion means, and swinging operating means engaging said expansion means for automatically adjusting said expansion means in proportion to the amount of swinging movement of said operating means.

8. A brake mechanism of the class described comprising a housing, a brake drum, brake shoes carried by said drum, longitudinally adjustable members pivotally secured to said shoes, operating means for swinging said adjustable members, and means engaging said adjustable members to longitudinally adjust said adjustable members as said members are swung for adjusting said shoes with respect to said drum in proportion to the amount of swing of said operating means.

VAN B. TAYLOR.